United States Patent [19]

Cheney

[11] 4,340,335
[45] Jul. 20, 1982

[54] HELICOPTER TAIL ROTOR WITH PITCH CONTROL MECHANISM

[75] Inventor: Marvin C. Cheney, Glastonbury, Conn.

[73] Assignee: United Technologies Corporation, Hartford, Conn.

[21] Appl. No.: 104,604

[22] Filed: Dec. 17, 1979

[51] Int. Cl.³ .................... B64C 27/38; B64C 27/78
[52] U.S. Cl. .................................... 416/138; 416/141
[58] Field of Search ............... 416/134 A, 138 A, 141, 416/105, 230 A, 168 R, 168 A, 123, 114, 159, 163, 226

[56] References Cited

U.S. PATENT DOCUMENTS

| | | | |
|---|---|---|---|
| 2,234,503 | 3/1941 | Ray | 416/168 X |
| 2,473,299 | 6/1949 | Pitcairn | 416/123 |
| 3,211,235 | 10/1965 | Bretl | 416/168 |
| 3,254,725 | 6/1966 | Higgins | 416/168 X |
| 3,506,219 | 4/1970 | Mouille et al. | 416/123 X |

FOREIGN PATENT DOCUMENTS 857462 12/1960 United Kingdom ............... 416/141

Primary Examiner—Everette A. Powell, Jr.
Attorney, Agent, or Firm—Vernon F. Hauschild

[57] ABSTRACT

In a helicopter tail rotor of flexrotor or, composite bearingless rotor design, a control wheel member is positioned in spaced relationship to the torque tube at the blade inner end and is connected thereto by pivotal push-pull rods connected at one of their ends to the control wheel member and at their opposite ends to the leading edge and trailing edge of the torque tube so that, as the control wheel member is selectively caused to rotate relative to the blade, one push-pull rod pulls upon the torque tube while the other push-pull rod pushes upon the torque tube to cause the torque tube to rotate, and hence the flexible spar to which it is attached to twist to thereby selectively change the blade pitch angle.

10 Claims, 4 Drawing Figures

HELICOPTER TAIL ROTOR WITH PITCH CONTROL MECHANISM

BACKGROUND OF THE INVENTION

1. Field of Invention

This invention relates to helicopter tail rotors and more particularly to helicopter tail rotors which are of the flexrotor or composite bearingless rotor design in which a torque tube, which forms the blade inner end, envelops the torsionally flexible structural spar, and including a control wheel member spaced from and connected to the torque tube inner end by push-pull rods so that as the control wheel member is caused to rotate relative to the torque tube inner end, the push-pull rods will both position the torque tube relative to the flexible spar member and cause the spar member to twist, thereby causing blade pitch variation.

2. Description of the Prior Art

In the early flexrotor or composite bearingless rotor designs, a torque tube was used in a fashion in which the torque tube was cantilevered from the outer end of the flexible beam spar and extended inwardly therefrom to form the blade inner end which was connected to a pitch control push rod. This early design was extremely attractive from the standpoint of simplicity, low weight and having a minimum of parts, however, it proved to have undesirable pitch-flap coupling characteristics and was potentially unstable. A snubber or support member, for example of the type taught in U.S. Pat. No. 4,087,203, was therefore added between the flexbeam spar and the torque tube inner end near the pitch control push rod attachment point so that the push rod load could be reacted without coupling with pitch. This design also incorporated a flatwise stiffness at the interface of the flexbeam spar and the torque tube so that the large bending moments would not be carried across this region and thereby avoid the creation of high stresses. This design is used in the Army BLACK HAWK helicopter and was found to be completely acceptable from the standpoint of stability and loads. The design, does, however, result in a system which contains an additional component, the snubber, which represents an added cost, an additional maintenance item, added weight, and could adversely effect reliability.

The principal object of the present invention is to eliminate the snubber of the earlier flexrotor design and to provide a pitch control system for the flexrotor which not only provides the required collective pitch variation for the tail rotor blades but also serves all functions previously performed by the snubber.

It is an object of this invention to teach a helicopter of the flexrotor type in which the pitch control system not only produces the required collective pitch variation in the tail rotor blades but also supports the blade torque tube with respect to the blade torsionally flexible structural spar.

It is a further object of this invention to teach such a tail rotor and its control system wherein the blade is caused to change pitch and the torque tube is positioned relative to the flexible spar by means of a selectively rotatable wheel member spaced from the torque tube inner end and connected thereto by push-pull rods, which not only serve the torque tube positioning function, but as the control wheel member is caused to rotate, one of the push-pull control rods pulls upon the torque tube inner end while the other push-pull rod pushes upon the torque tube inner end to cause the blade to change pitch.

It is a further object to teach such a control system for a helicopter tail rotor flexrotor which has the advantage of push-pull rod redundancy in that, if one of the two push-pull rods fails, the other could be used to control blade pitch with the torque tube bottomed out against flexbeam spar, as an emergency measure.

It is a further object to teach such a helicopter tail flexrotor in which the blades are caused to change pitch by a mechanism which rotates, rather than translates relative to the tail rotor, thereby eliminating the drag created by the earlier translating tail rotor pitch controls. These prior art translating tail rotor pitch controls are typically of the type shown in U.S. Noehren et al Pat. No. 4,008,980. Other controls which translate for pitch variation are shown in Seibel U.S. Pat. No. 2,575,533 and U.S. Pat. No. 3,957,227. While U.S. Elmer Pat. No. 3,218,808 uses a rotary motion in the fan art, it should be noted that this is a rigid fan blade and utilizes but a single pitch rod. The mechanism is a simple centrifugal pitch control which uses a hinged mass operating against a spring to vary the fan blade pitch as a function of rpm.

Other objects and advantages of the present invention may be seen by referring to the following description and claims, read in conjunction with the accompanying drawings.

DESCRIPTION OF THE PREFERRED EMBODIMENT

Figure 1:
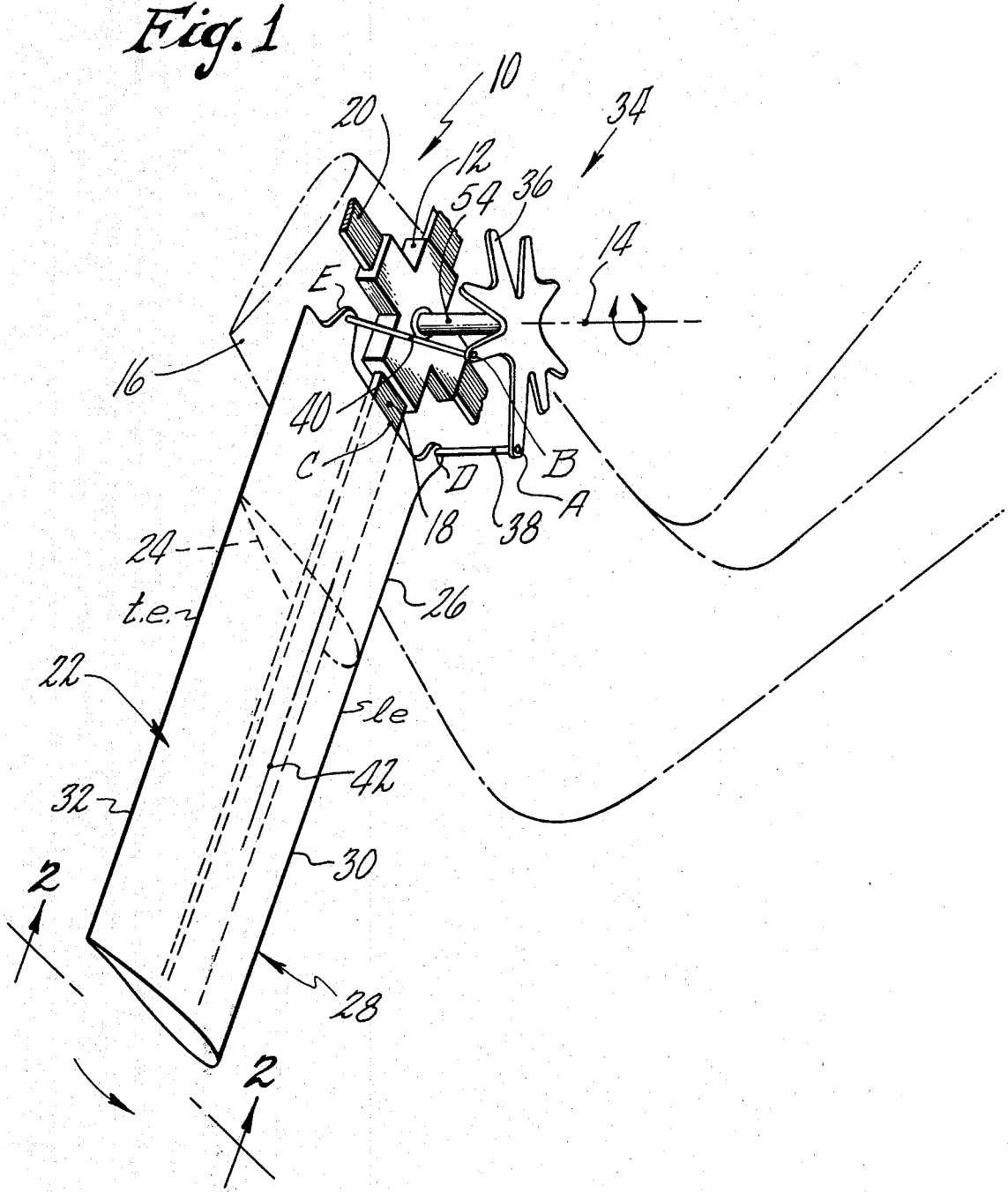
FIG. 1 is a partial showing of a helicopter tail rotor of the flexrotor design, and having a pitch control actuator located axially outboard of the blade.

Viewing FIG. 1 we see helicopter tail rotor 10 of the flexrotor design and with only one of four blades shown. Rotor 10 includes hub 12, which is mounted for rotation about axis of rotation 14 from helicopter tail section 16. Structural spars 18 and 20 are supported from hub 12 for rotation therewith and extend radially outwardly therefrom from axis 14. In typical flexrotor fashion, spars 18 and 20 are of composite construction and fabricated so as to have high tensile strength and substantial torsional flexibility. Blade airfoil section 22 envelopes spar 18 and is connected thereto in conventional fashion at flexure or joint 24 so that hollow torque tube 26 projects inwardly from juncture 24 to envelope spar 18 in spaced relationship. Airfoil section 22, spar 18 and torque tube 26 cooperate in this fashion to form blade 28 which has leading edge 30 and trailing edge 32. In conventional fashion, the pitch of blade 28 will be changed collectively with the pitch of the other blade (not shown) by causing torsional flexure of spars 18 and 20. In a helicopter tail rotor, collective pitch only is required since the function of the tail rotor is to produce anti-torque to the main rotor and yaw control. Cyclic pitch variation, required in the main rotor is not required in the tail rotor.

Rotor 10 may be of the type shown in Fenaughty U.S. Pat. No. 3,874,820.

Pitch control mechanism 34 includes control wheel member 36 which is positioned in spaced axial relationship along axis 14 from blade 28 of rotor 10, and is mounted from hub 12 for controlled relative rotation thereto during pitch change mode, and for rotation therewith during normal tail rotor operation. Leading edge push-pull rod 38, and trailing edge push-pull rod 40 extend between points A and B, where they are connected by ball joints to control wheel 36, and points D and E where they are connected by ball joints to the leading edge and trailing edge, respectively, of the torque tube 26. In a manner described hereinafter, when wheel member 36 is caused to rotate relative to hub 12, one of the two push-pull rods 38-40 will pull upon torque tube 26, while the other of the two push-pull rods 38-40 will push upon torque tube 26, thereby causing the torque tube to rotate about blade pitch change axis 42, thereby causing flexural spar 18 to twist thereabout, resulting in pitch change of the blade 28.

Figure 2:
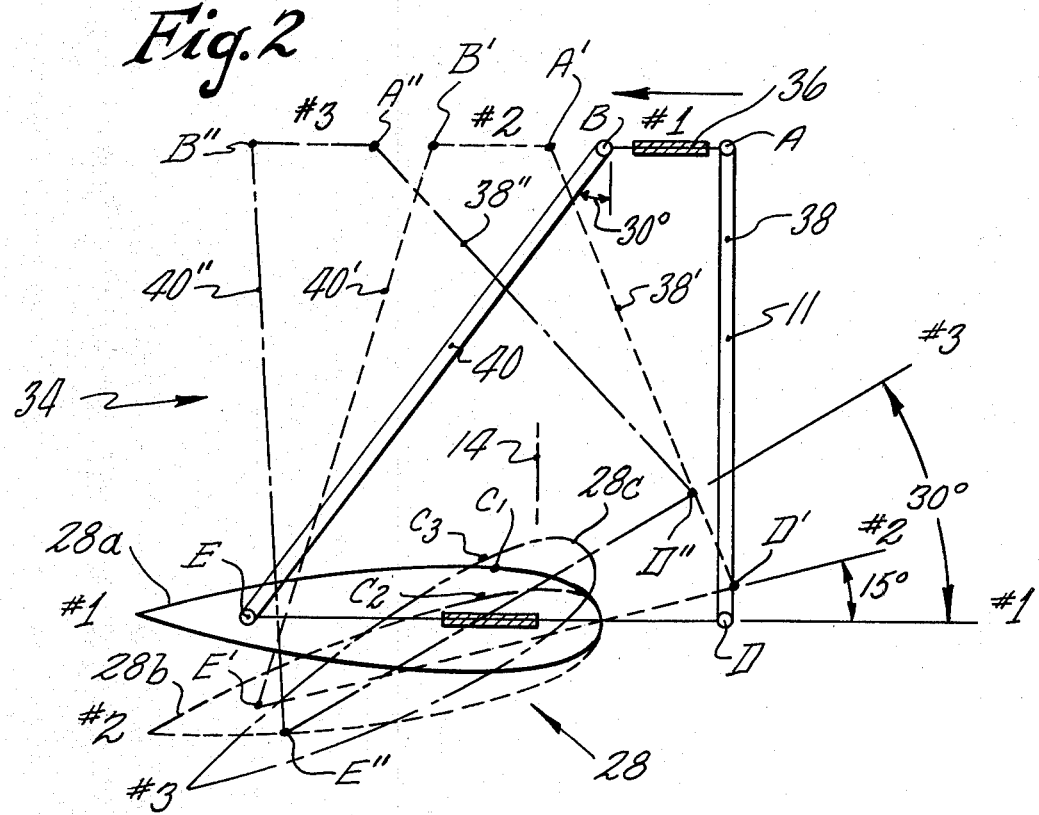
FIG. 2 is a showing from the end view of the blade tip, along line 2—2 of FIG. 1.

Pitch control 34 will be better understood by considering FIG. 2 which shows the blade 28 in its minimum or flat pitch position at 28a, in an intermediate pitch position some 15° therefrom at 28b and in its maximum 30° pitch position at 28c. Considering the minimum or flat pitch position 28a, it will be noted that leading edge push-pull rod 38 extends substantially parallel to the blade axis of rotation 14, while push-pull rod 40 forms an angle of substantially 30° therewith. It will be noted that the circumferential spacing A-B of the push-pull rods connections to the control wheel is substantially smaller, and preferably about $\frac{1}{3}$ of the spacing D-E of the push-pull rods connection to the torque tube 26.

As control wheel 36 moves leftwardly in the FIG. 2 showing, leading edge push-pull rod 38 will pull upon the leading edge of the torque tube 26 while push-pull rod 38 moves to position 38' and its end connections to points A' and D'. At the same time, push-pull rod 40 will push upon the trailing edge of torque tube 26 as that push-pull rod moves to position 40' and its end connections move to locations B' and E'. In view of this leftward motion of the control wheel 36, blade 28 has changed pitch some 15° as illustrated as it moved from position 28a to position 28b. Torque tube 26 is fabricated to have high stiffness and hence restraint to edgewise motion so that the push-pull motion of rods 38 and 40 produces pitch change motion only. Similarly, as leftward motion of control wheel 36 continues, control rods 38 and 40 will assume positions 38" and 40", while points a-d move to positions a", b", d" and e" as blade 28 varies pitch to its 30° full pitch position at 28c. It will be noted that during the leftward motion of control wheel 36 as illustrated in FIG. 2, rod 38 has performed a pulling function throughout, while rod 40 has performed a pushing function throughout. Similarly, when control wheel 36 moves rightwardly, torque tube 26 is returned to its original position.

While points A and B are shown in the same plane in FIG. 2, it should be borne in mind that this need not be the case so long as the push and pull function is achieved. For example, point A could be farther axially displaced from the blade than point B and control 34 would operate properly if both points A and B were supported to rotate in planes perpendicular to the axis of rotation 14.

It will further be noted that since rods 38 and 40 are solid rods, and are pivotally connected to control wheel member 36 and the inner ends of torque tube 26, rods 38 and 40 perform the additional function of positioning torque tube 26 relative to spar 18 in spaced relation thereto.

Point C is indicated in FIG. 2 as the blade $\frac{1}{4}$ chord position and it will be noted that there is a slight flatwise motion as pitch varies from minimum to maximum. This motion will not result in significant torque tube stresses due to the reduced stiffness of the torque tube as designed at juncture 24, in fact, those skilled in the art will realize that by proper selection of the length of rods 38 and 40, and the position of points A, B, D and E stresses could be reduced over the snubber design by having point C displaced intentionally in the direction that it seeks resulting from high blade lift.

Figure 3:
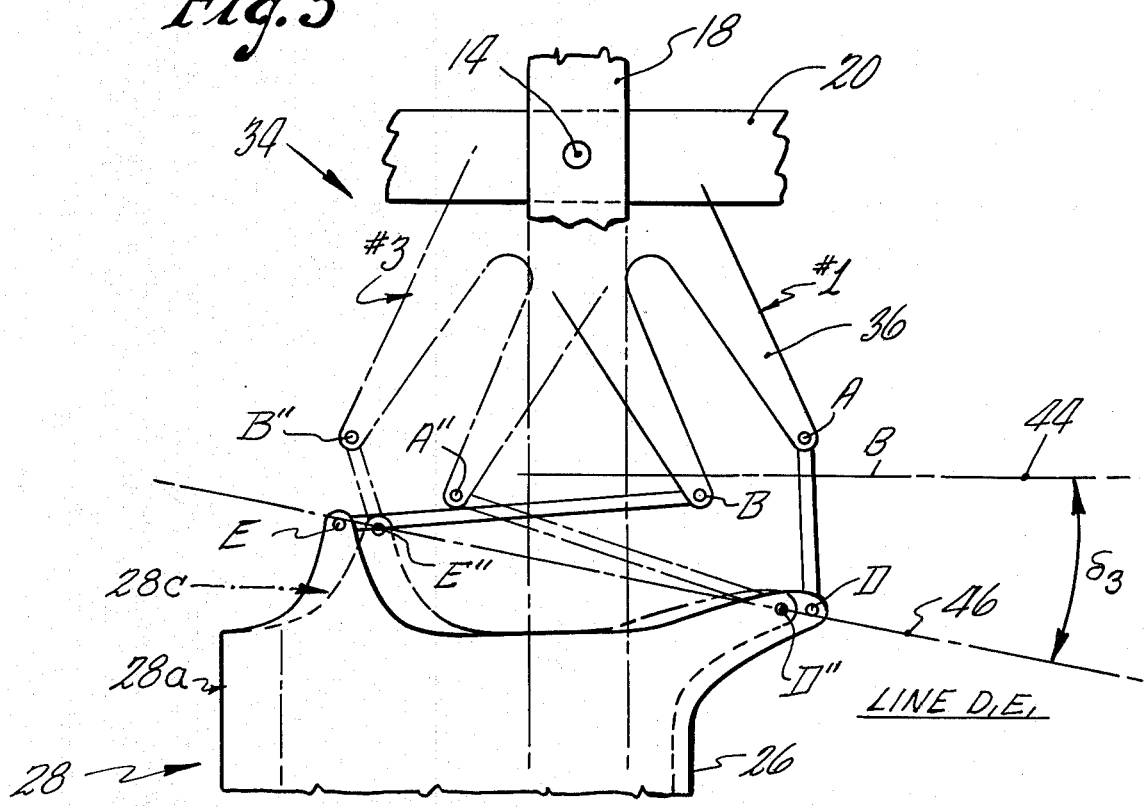
FIG. 3 is a side view with the blade in its full pitch position illustrating the relative position between the pitch control wheel, the two push-pull rods and the torque tube inner ends and further illustrating, in part, the $\delta$ 3 benefit of this invention.

A concern in all helicopter rotors is the effect of the flapping motion of the blade on blade pitch. This is known as the $\delta$ 3 effect. An advantage of my blade is that the control can be constructed such that the $\delta$ 3 effect can be used to advantage. This can be appreciated by viewing FIG. 3 which is a side view of the blade and control 34. In FIG. 3, blade 28 is shown in its full pitch position 28c of FIG. 2, and further in its flat pitch position 28a.

Still viewing FIG. 3, we note that blade virtual flap axis is shown as line 44, and this is the line that blade 28 can be considered to flap about during its any blade flapping motion, and corresponds to the flapping axis of the earlier hinged rotor constructions. Line 46 represents a line drawn through points D and E when in their full pitch positions, namely, points D" and E", and angle $\delta$ 3 the angle defined between lines 44 and 46. By so positioning point E, closer to axis 44 than point D, we obtain the benefit that during positive flapping of blade 28, a stabilizing negative pitch change is produced in blade 28 equal to the tangent of angle $\delta$ 3 times the positive flapping angle. If the blade were to flap in a negative flapping, this construction would produce a stabilizing positive pitch change equal to tangent angle $\delta$ 3 times the negative flapping angle.

Figure 4:
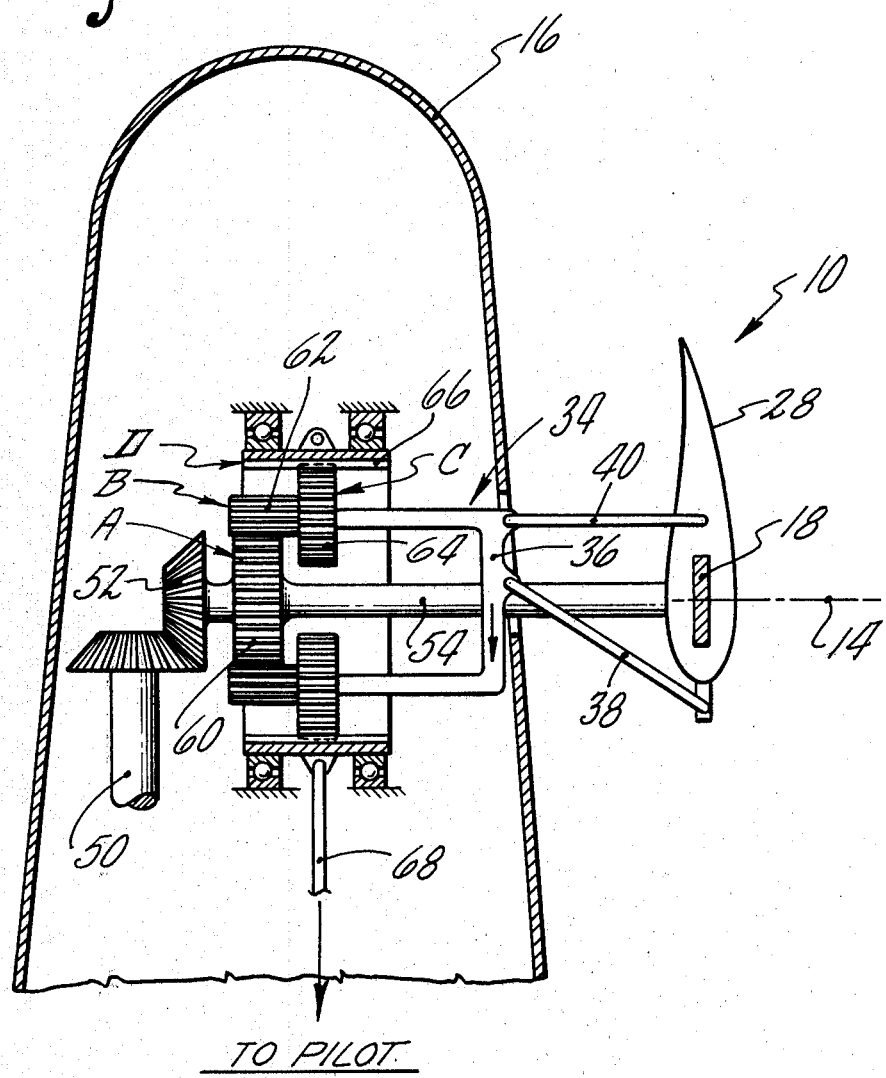
FIG. 4 shows a modification of my invention in which the pitch control is located axially inboard of the rotor and includes means to cause the pitch control wheel member to rotate relative to the rotor for pitch change purposes.

Viewing FIG. 4 we see a modification of the invention in which pitch control 34 is positioned on the opposite side of blade 28 than it is in the FIG. 1 construction. In this construction it will be noted that rod 40 is substantially parallel to axis of rotation 14 and rod 38 forms a substantial angle therewith.

In the FIG. 4 construction, blade pitch is caused to change in the same fashion as it is in the FIG. 1 construction in that as control member 36 rotates relative to blade 28 about axis 14, rods 38 and 40 perform respective pushing and pulling functions on the torque tube so as to cause the blade 28 to change pitch in the same fashion. For example, if rotation were to be as shown by the arrow in the FIG. 4 construction, rod 38 would perform a pushing function on the torque tube and rod 40 would perform a pulling function on the torque tube. If rotation were in the opposite direction rod 38 would pull, but the effect in either case would be to vary blade pitch collectively.

In the FIG. 4 construction, pitch control 34 is positioned inboard of rotor 10 and blades 28. The FIG. 4 modification has the advantage that the pitch control 34 is submerged in the tail fin 16 and is therefore a reduced drag construction.

Viewing FIG. 4 we see that drive shaft 50 drives through a conventional gear system 52 to drive rotor drive shaft 54, to which hub 12 is drivingly connected. It is important that pitch control 34 rotate at the same speed as tail rotor 10 during normal operation, but be responsive to pilot command to rotate with respect thereto to vary pitch as required by the pilot. It will be obvious to those skilled in the art that this can be achieved through the construction shown in FIG. 4. For example, control 34 will rotate at the speed of tail rotor 10, if gear 62 is one third the diameter of gear 60, and gear 64 is two thirds the diameter of gear 60. Ring gear 66 envelopes gears 64 and is connected by pulley 68, or other conventional means, to the pilot control. Accordingly, when the pilot wishes to vary pitch of the tail rotor, he applies an appropriate load to pulley 68, thereby causing ring gear 66 to rotate, producing rotation of pitch control 34 relative to rotor 10.

It will therefore be seen that the pitch control mechanisms of FIGS. 1 and 4 not only serves to vary tail rotor pitch collectively as dictated by the pilot, but also serves to position the torque tube relative to the spar, thereby eliminating the need for the snubber.

I wish it to be understood that I do not desire to be limited to the exact details of construction shown and described, for obvious modifications will occur to a person skilled in the art.

I claim:

1. A helicopter anti-torque tail rotor rotatable about an axis of rotation and comprising:
   (A) a hub member adapted to be supported from a helicopter tail section for rotation about said axis of rotation,
   (B) at least one helicopter blade extending radially from said hub for rotation therewith and including,
      (1) a torsionally flexible structural spar fabricated to have substantial tensile strength and high torsional flexibility and connected to said hub for rotation therewith and projected substantially radially therefrom,
      (2) a blade airfoil section enveloping said spar and having a leading edge, a trailing edge, a tip end, and a root end,
      (3) a hollow torque tube enveloping the spar in spaced relationship and forming the blade root end,
      (4) means connecting said torque tube outer end to said flexible spar at a radial station therealong so that blade pitch motion between minimum pitch and maximum pitch positions is permitted due to torsional flexure of the spar,
   (C) pitch control means mounted for rotation with said hub and including:
      (1) a control wheel member mounted for rotation concentrically about and extending perpendicular to said axis of rotation and positioned in spaced axial relationship to the torque tube inner end,
      (2) first and second push-pull rods extending between and pivotally connected to said control wheel member at circumferentially spaced stations thereon and with the opposite ends of the first and second push-pull rods pivotally connected, respectively, to the leading edge and the trailing edge of the torque tube inner end at stations spaced a substantially greater distance than the circumferentially spacing of the push-pull rods on the control wheel members, said rods being oriented so that one of push-pull rods extends substantially parallel to said axis of rotation when the blade is in its minimum pitch position and so that the other of said push-pull rods forms a substantial angle with said axis of rotation, so that as the control wheel member is selectively caused to rotate relative to the hub, one of said push-pull rods will push said torque tube while the other push-pull rod pulls said torque tube so as to cause said flexible spar to twist and thereby selectively cause said blade to change pitch between its minimum pitch position and its maximum pitch position.

2. A helicopter rotor according to claim 1 wherein said connecting means constitutes the only connection between said torque tube and said flexible spar, and wherein said push-pull rods serve to axially restrain the torque tube with respect for the spar.

3. A helicopter rotor according to claim 2 wherein the circumferential spacing between said first and second push-pull rods at their connections to said control wheel member is approximately one-third of the spacing between the other ends of said first and second push-pull rods at their connections to the torque tube.

4. A helicopter rotor according to claim 3 wherein said second push-pull rod forms an angle of substantially 30° with said axis of rotation.

5. A helicopter rotor according to claim 4 wherein said push-pull rods are connected to said control wheel member and said torque tube by ball joints.

6. A helicopter rotor according to claim 5 wherein said torque tube is fabricated to be of high stiffness to provide edgewise motion restraint thereof.

7. A helicopter rotor according to claim 6 wherein said flexible spar is fabricated so as to permit positive and negative flapping thereof with said blade about a blade virtual flapping hinge axis, and further wherein, when said blade is in said maximum pitch position, the point of connection between the first push-pull rod and the torque tube leading edge is radially further from the blade virtual flapping hinge axis than the point of connection between the second push-pull rod and the torque tube trailing edge, and so that a line passing between said points of connection forms a selected angle with the blade virtual flapping hinge axis so that positive flapping of the blade produces a stabilizing negative pitch change, and so that negative flapping of the blade produces a stabilizing positive pitch change.

8. A helicopter tail rotor according to claim 7 and including means to cause said control wheel member to selectively rotate about its axis relative to said blade.

9. A helicopter tail rotor according to claim 6 wherein the control wheel member is positioned axially outboard of the blade and wherein, when said blade is in its minimum pitch position the push-pull rod which is connected to the torque tube leading edge extends substantially parallel to the axis of rotation, and the push-pull rod which is connected to the torque tube trailing edge forms a substantial angle with the axis of rotation.

10. A helicopter rotor according to claim 6 wherein the control wheel member is positioned axially inboard of the blade and wherein, when the blade is in its minimum pitch position the push-pull rod connected to the blade trailing edge is substantially parallel to the axis of rotation and the control rod connected to the blade leading edge forms a substantial angle therewith.

* * * * *